UNITED STATES PATENT OFFICE.

JOHANN CARL WILHELM FERDINAND TIEMANN, OF BERLIN, ASSIGNOR TO HAARMANN & REIMER, OF HOLZMINDEN, GERMANY.

AROMATIC KETONE AND PROCESS OF MAKING SAME.

SPECIFICATION forming part of Letters Patent No. 556,943, dated March 24, 1896.

Application filed May 11, 1893. Serial No. 473,852. (Specimens.) Patented in Canada April 9, 1893, No. 45,743; in Germany April 25, 1893, No. 73,089; in England May 1, 1893, No. 8,736; in Sweden May 8, 1893, No. 5,087; in Norway May 18, 1893, No. 3,257; in Luxemburg June 23, 1893, No. 1,843; in Belgium June 24, 1893, No. 105,249; in Italy June 30, 1893, XXVII, 34,126, and LXVII, 384; in Spain August 31, 1893, No. 14,651; in Portugal November 30, 1893, No. 1,829; in Austria January 8, 1894, No. 24,418; in Hungary January 8, 1894, No. 93,338, and in Denmark April 3, 1895, No. 13.

*To all whom it may concern:*

Be it known that I, JOHANN CARL WILHELM FERDINAND TIEMANN, a subject of the King of Prussia, residing at Berlin, in the Kingdom of Prussia, Germany, have discovered and produced a new and useful Aromatic Ketone, (for which I have obtained Letters Patent in Germany, No. 73,089, dated April 25, 1893; in Sweden, No. 5,087, dated May 8, 1893; in Denmark, No. 13, dated April 3, 1895; in Spain, No. 14,651, dated August 31, 1893; in Austria, No. 24,418, tom. 44, fol. 667, dated January 8, 1894; in Hungary, No. 93,338, tom. XXVIII, fol. 145, dated January 8, 1894; in Canada, No. 45,743, dated April 9, 1894; in Norway, No. 3,257, dated May 18, 1893; in Portugal, No. 1,829, dated November 30, 1893; in Belgium, No. 105,249, dated June 24, 1893; in Italy, Reg. Gen. Vol. XXVII, No. 34,126, Reg. Att. Vol. LXVII, No. 384, dated June 30, 1893; in Luxemburg, No. 1,843, dated June 23, 1893, and in Great Britain, No. 8,736, dated May 1, 1893,) of which the following is a specification.

I have found that a mixture of citral and acetone, if subjected in presence of water for a sufficiently long time to the action of hydrates of the alkaline earths or of alkaline hydrates, such as hydrate of barium, or to the action of other alkaline agents, yields a ketone of the formula $C_{13}H_{20}O$.

The citral above referred to is an unsaturated aldehyde of the fatty-acid series found in larger quantities in lemon-oil, lemon-grass oil and other volatile oils, its formula being $C_{10}H_{16}O$. Citral is obtained from these oils by the production of an easily-crystallizing double compound of bisulphite of sodium, which is soluble with difficulty. It can, however, also be produced by the oxidation of the corresponding primary alcohol, geraniol. The specific gravity of citral is 0.895 at 15° centigrade. Its boiling-point is 226° centigrade.

The lemon-grass oil above referred to is the oil of commerce, and it is immaterial whether lemon-oil or lemon-grass oil, both of which are usually designated by the latter name, is used.

This ketone may be produced, for instance, as follows: Equal parts of citral and acetone, together with a solution of hydrate of barium, are agitated for several days, and the products of this reaction are dissolved in ether. Then the residue resulting from the evaporation of the ether solution is subjected to fractional distillation under a reduced pressure. The fraction distilling over under a pressure of twelve millimeters at a temperature of from 138° to 155° centigrade is then collected, and the unaffected citral and acetone and the volatile products of condensation of the latter are carried off by a current of steam, by which they are easily removed from the same. The product of condensation remaining in the distilling apparatus is purified by fractional distillation *in vacuo*. Under a pressure of twelve millimeters a liquid distills at a temperature of from 143° to 145° centigrade. This product of condensation is a ketone readily decomposable by the action of alkalies. Its formula is $C_{13}H_{20}O$, its index of refraction is $n^D = 1.527$, and its specific gravity 0.904. It has a peculiar, but not very pronounced, odor. Like most of the ketones of the higher series, it does not combine with bisulphite of sodium; but in other respects it possesses the characteristic properties of the ketones, forming, in particular, products of condensation with phenylhydrazin, hydroxylamine and other substituted ammonias.

Though the odor of this ketone apparently does not give it a great importance for direct use in perfumery, yet it serves as raw material for the production of perfumes, it being converted by the action of dilute acids into an isomeric ketone, which may be termed an "artificial-violet" ketone, and which has properties most valuable for the manufacture of perfumery. This conversion may be effected, for instance, by heating for several hours in an oil-bath twenty parts of the ketone with one hundred parts water, 2.5 parts sulphuric acid and one hundred parts glycerine to the boiling-point of the mixture. The product of the reaction is taken up in ether. The latter is evaporated and the residue subjected to fractional distillation *in vacuo*. The fraction distilling under a pressure of twelve millimeters at a temperature of from 125° to 135° centigrade is collected. This product may be further purified by converting it with phenylhydrazin or other substituted ammonias characteristic for the ketones into products of condensation decomposable by the action of dilute acids.

The ketone derivatives of the first-mentioned ketone can be converted similarly by the action of dilute acids into ketone derivatives of the second. The second ketone corresponds to the formula $C_{13}H_{20}O$. It distills under a pressure of twelve millimeters at a temperature of about 128° centigrade. Its specific gravity is of 0.935 and its index of refraction $n^D = 1.507$. It has an odor fragrant of violets and grape-blossoms and is particularly adapted for use in perfumery, confectionery, and distillation. It is insoluble in water and easily soluble in alcohol, ether, chloroform, and benzene.

When this ketone is subjected at a higher temperature to the action of hydriodic acid, it splits off water and gives a hydrocarbon corresponding to the formula $C_{13}H_{18}$, distilling under a pressure of twelve millimeters at a temperature of from 106° to 112° centigrade. This hydrocarbon is converted by strong oxidizing agents into an acid of the formula $C_{12}H_{12}O_6$, melting at a temperature of 214° centigrade.

What I claim as new is—

1. As a new product, a fragrant ketone corresponding to the formula $C_{13}H_{20}O$, (artificial-violet ketone;) boiling-point 128° centigrade at a pressure of twelve millimeters, specific gravity 0.935 and index of refraction 1.507; said ketone being insoluble in water and easily soluble in alcohol and benzene.

2. The herein-described method of producing a fragrant ketone, which consists in treating citral (a component of lemon-grass oil of the formula $C_{10}H_{16}O$) and acetone in equal parts with an alkaline agent and dissolving the product in ether, subjecting the residue of evaporation to fractional distillation under a reduced pressure, collecting the part distilling over under a pressure of about twelve millimeters and a temperature of from 138° to 155° centigrade, separating the citral, acetone, &c., still present by a current of steam, purifying the ketone thus obtained by fractional distillation *in vacuo* under a pressure of twelve millimeters and a temperature of from 143° to 145°, and finally converting the same into a fragrant isomeric ketone by the action of dilute acids, and subsequent fractional distillation.

3. The herein-described method of producing a fragrant ketone of the formula $C_{13}H_{20}O$, from a mixture of citral and acetone, consisting in treating the mixture with alkaline agents, dissolving the product in ether and purifying the ketone formed, by fractional distillation.

4. The herein-described method of producing a fragrant ketone of the formula $C_{13}H_{20}O$ consisting in subjecting an isomeric ketone, to the action of dilute acids, and to fractional distillation.

In testimony whereof I have signed my name to this specification in the presence of two subscribing witnesses.

JOHANN CARL WILHELM FERDINAND TIEMANN.

Witnesses:
LUDWIG GLASER,
GUSTAV HÜLSMANN.